US008774632B2

(12) United States Patent
Archambault (10) Patent No.: US 8,774,632 B2
(45) Date of Patent: Jul. 8, 2014

(54) RECONFIGURABLE OPTICAL ADD DROP MULTIPLEXER NODE AUTOMATED TOPOLOGY DISCOVERY SYSTEMS AND METHODS

(75) Inventor: Jean-Luc Archambault, Severna Park, MD (US)

(73) Assignee: Ciena Corporation, Hanover, MD (US)

( * ) Notice: Subject to any disclaimer, the term of this patent is extended or adjusted under 35 U.S.C. 154(b) by 406 days.

(21) Appl. No.: 12/767,921

(22) Filed: Apr. 27, 2010

(65) Prior Publication Data

US 2011/0262142 A1    Oct. 27, 2011

(51) Int. Cl.
*H04J 14/02* (2006.01)
*H04L 12/28* (2006.01)

(52) U.S. Cl.
USPC .................. 398/83; 398/82; 398/79; 398/43; 370/254; 370/524

(58) Field of Classification Search
USPC ................................................ 398/83, 82, 79
See application file for complete search history.

(56) References Cited

U.S. PATENT DOCUMENTS

| 6,532,102 | B2 * | 3/2003 | Kobayashi et al. | 359/334 |
|---|---|---|---|---|
| 2002/0191241 | A1 * | 12/2002 | Emery et al. | 359/109 |
| 2003/0058496 | A1 | 3/2003 | Obeda et al. | |
| 2005/0141437 | A1 * | 6/2005 | Burnett et al. | 370/254 |
| 2008/0232738 | A1 * | 9/2008 | Yang et al. | 385/24 |
| 2009/0226168 | A1 * | 9/2009 | Boduch | 398/48 |

FOREIGN PATENT DOCUMENTS

EP           1551125 A2    6/2005

OTHER PUBLICATIONS

Kim Papakos—Tellabs 7100 DWDM; Leveraging Directionless & colorless Updates to Existing ROADM-based Networks; Market Watch Panel IV—OFC 2009 Conference, San Diego, U.S.A.; Mar. 26, 2009.
Prasanna. G, Sai Kishore. B, Cmprasad. G.K., Sathyanarayana Raju. K, Gowrishankar. R, Venkataramaniah. K, Johnson Ron, Voruganti Pavan; "Versatility of a colorless and directionless WSS based ROADM architecture"; OpVista Inc, Milpitas, VA, USA; Opitcal Fiber Communication/National Fiber Optic Engineers Conference, 2008, OFC/NFOEC 2008, Feb. 24-28, 2008 pp. 1-3.
Peter Roorda, Brandon Collings; "Evolution to Colorless and Directionless ROADM Architecture"; (c) 2008 Optical Society of America; OCIS codes: (060.1155) All-optical Networks : (060-1810) Couplers, switches, and multiplexers.

* cited by examiner

*Primary Examiner* — Oommen Jacob
(74) *Attorney, Agent, or Firm* — Clements Bernard PLLC; Christopher L. Bernard; Lawrence A. Baratta, Jr.

(57) ABSTRACT

The present disclosure provides reconfigurable optical add drop multiplexer (ROADM) node automatic topology discovery systems and methods providing a mapping of optical connections within a mesh optical network that includes tunable lasers and multi-degree ROADM's with colorless/directionless add/drop. The present disclosure may include additional transceiver, receiver, and add/drop filter equipment integrated in or disposed at a ROADM degree. This equipment supports a so-called topology wavelength which is one of a plurality of wavelengths supported by a wavelength division multiplexed (WDM) system that is dedicated and used solely for topology discovery. The topology wavelength may be utilized by the system to detect interconnects between ROADM degrees and between XCVRs/CDMDs. Further, the automated topology discovery may be integrated within a management system and/or control plane.

20 Claims, 6 Drawing Sheets

RECONFIGURABLE OPTICAL ADD DROP MULTIPLEXER NODE AUTOMATED TOPOLOGY DISCOVERY SYSTEMS AND METHODS

FIELD OF THE INVENTION

The present invention relates generally to optical networking. More particularly, the present invention relates to reconfigurable optical add drop multiplexer (ROADM) node automatic topology discovery systems and methods providing a mapping of optical connections within a mesh optical network that includes tunable lasers and multi-degree ROADM's with colorless/directionless add/drop.

BACKGROUND OF THE INVENTION

With the introduction of colorless, directionless, multi-degree ROADM nodes, optical systems are becoming more and more complex and in particular, the number of optical interconnects involved in network elements is growing rapidly. As a result, there is an increasing need to add intelligence to make the deployments of such systems more automated, in particular by having the system software being able to recognize how the different modules and network elements are connected to each other. Another key reason to implement this type of intelligence is to support advanced functions in the optical layer, such as mesh protection and restoration, which require a control plane that has complete knowledge of the optical network topology. Conventional designs that have been proposed to auto-discover optical system topology include 1) using tone signals to trace wavelengths through the network; 2) using a low-level wavelength-tunable monitor signal to probe the system, such as described in commonly assigned U.S. Pat. No. 6,795,607 to Archambault et al. issued on Sep. 21, 2004 and entitled "USE OF TUNABLE LASER FOR OPTICAL PERFORMANCE MONITORING IN WDM SYSTEM," the contents of which are herein incorporated by reference; and 3) using "smart cables" to automatically detect interconnects between modules.

Limitations of the aforementioned designs include simple tone signals tend to wash out in very long systems. These tone signals also add complexity to transmitter design. A more complex implementation of the tone signals requires fairly high speed modulation on the transmitter side, which is difficult and costly to implement. Further, the use of a tunable probe signal requires a fair amount of additional hardware and software to be added to the system and is not able to monitor connections to individual transceivers, only between line modules. Thirdly, smart optical cables are not widely available, not standardized, and require special hardware for all the connection points. The smart optical cables also only provide information about how modules are physically interconnected within a network element, but not about how wavelengths are being switched or how network elements are interconnected in a mesh network.

BRIEF SUMMARY OF THE INVENTION

In various exemplary embodiments, a degree in a reconfigurable optical add drop multiplexer node includes transmit optical components configured to receive a plurality of transmit wavelengths and to transmit the plurality of transmit wavelengths external to the node; receive optical components configured to receive a plurality of receive wavelengths external from the node and to transmit the plurality of receive wavelengths to one or more components in the node; and topology optical components configured to transmit and receive a topology wavelength both external to the node and to the one or more components in the node, wherein the topology optical components are connected to the transmit optical components and the receive optical components, and wherein the topology wavelength includes one of the plurality of transmit wavelengths and the plurality of receive wavelengths. The topology wavelength includes the same wavelength in the plurality of transmit wavelengths and the plurality of receive wavelengths, and wherein the topology wavelength is dedicated to providing topology discovery. The degree further includes a topology discovery algorithm utilizing the topology optical components to detect connections of the degree to other degrees in the reconfigurable optical add drop multiplexer node and to other nodes connected to or through the reconfigurable optical add drop multiplexer node. The topology discovery algorithm includes transmitting the topology wavelength using the topology optical components; and mapping connections of the degree through a network and the reconfigurable optical add drop multiplexer node responsive to topology optical components detecting the topology wavelength. The degree further includes one or more local add/drop transceivers connected to the transmit optical components and the receive optical components; and a topology discovery algorithm utilizing the topology optical components to detect connections of the one or more local add/drop transceivers. The topology discovery algorithm includes tuning a transceiver to the topology wavelength; connecting the transceiver to the transmit optical components; and detecting connections through a network and the reconfigurable optical add drop multiplexer node responsive to topology optical components detecting the topology wavelength. The degree further includes a Colorless/Directionless multiplexer/demultiplexer module connected to transmit optical components and the receive optical components; one or more local add/drop transceivers connected to the Colorless/Directionless multiplexer/demultiplexer module; and a topology discovery algorithm utilizing the topology optical components to detect connections of the Colorless/Directionless multiplexer/demultiplexer module and the one or more local add/drop transceivers. The topology discovery algorithm includes tuning unprovisioned ports on the Colorless/Directionless multiplexer/demultiplexer module to the topology wavelength; tuning a transceiver to the topology wavelength; connecting the transceiver to a port on the Colorless/Directionless multiplexer/demultiplexer module; and switching the transceiver via the Colorless/Directionless multiplexer/demultiplexer module to a plurality of degrees; and detecting connections through a network and the reconfigurable optical add drop multiplexer node responsive to topology optical components detecting the topology wavelength. The topology optical components include a transceiver configured to transmit and receive at the topology wavelength; and one of an optical channel monitor configured to receive and detect the topology wavelength and a receiver configured to receive and detect the topology wavelength. The transceiver is connected to the receive optical components and the one of the optical channel monitor and the receiver is connected to the transmit optical components. The transceiver may include data modulation configured to encode any of node identification, address, and channel identification on the topology wavelength. The topology optical components are configured to operate in-service to map connections through the reconfigurable optical add drop multiplexer node and through a network containing the reconfigurable optical add drop multiplexer node without disrupting data traffic. The transmit optical components and the receive optical components may include any of 1×N combiners, 1×N splitters, and wavelength selective switches configured to provide a colorless and directionless architecture.

In another exemplary embodiment, a method for automated topology discovery in an optical network includes dedicating one of a plurality of wavelengths supported in the optical network as a topology wavelength; transmitting the topology wavelength from one degree at one node in the optical network; and mapping connections of the one degree through the optical network responsive to topology optical components at each degree in the optical network detecting the topology wavelength. The method further includes transmitting detected connections to a management system; and utilizing the detected connections to display a network map in the management system. The method further includes adding a transceiver to a node in the optical network; tuning a transceiver to the topology wavelength; connecting the transceiver a degree at the node; and detecting connections through the optical network responsive to topology optical components at each degree in the optical network detecting the topology wavelength. The method further includes tuning unprovisioned ports on a Colorless/Directionless multiplexer/demultiplexer module to the topology wavelength; tuning a transceiver to the topology wavelength; connecting the transceiver to a port on the Colorless/Directionless multiplexer/demultiplexer module; and switching the transceiver via the Colorless/Directionless multiplexer/demultiplexer module to a plurality of degrees; and detecting connections through the optical network responsive to topology optical components at each degree in the optical network detecting the topology wavelength.

In yet another exemplary embodiment, a mesh optical network includes a plurality of interconnected reconfigurable optical add drop multiplexer nodes, wherein each of the plurality of interconnected reconfigurable optical add drop multiplexer nodes includes at least one optical degree; and topology discovery hardware at each of the optical degrees, the topology discovery hardware is configured to transmit and receive a topology wavelength including one of a plurality of wavelengths for automatically discovering topology of the mesh optical network. The mesh optical network further includes a management system connected to one or more of the plurality of interconnected reconfigurable optical add drop multiplexer nodes; wherein the management system is configured to receive the discovered topology from each of the optical degrees. The plurality of interconnected reconfigurable optical add drop multiplexer nodes include colorless and directionless components.

BRIEF DESCRIPTION OF THE DRAWINGS

The present invention is illustrated and described herein with reference to the various drawings of exemplary embodiments, in which like reference numbers denote like method steps and/or system components, respectively, and in which.

DETAILED DESCRIPTION OF THE INVENTION

In various exemplary embodiments, the present invention provides reconfigurable optical add drop multiplexer (ROADM) node automatic topology discovery systems and methods providing a mapping of optical connections within a mesh optical network that includes tunable lasers and multi-degree ROADM's with colorless/directionless add/drop. The present invention may include additional transceiver, receiver, and add/drop filter equipment integrated in or disposed at a ROADM degree. This equipment supports a so-called topology wavelength which is one of a plurality of wavelengths supported by a wavelength division multiplexed (WDM) system that is dedicated and used solely for topology discovery. The topology wavelength may be utilized by the system to detect interconnects between ROADM degrees and between XCVRs/CDMDs. Further, the automated topology discovery may be integrated within a management system and/or control plane.

Figure 1:
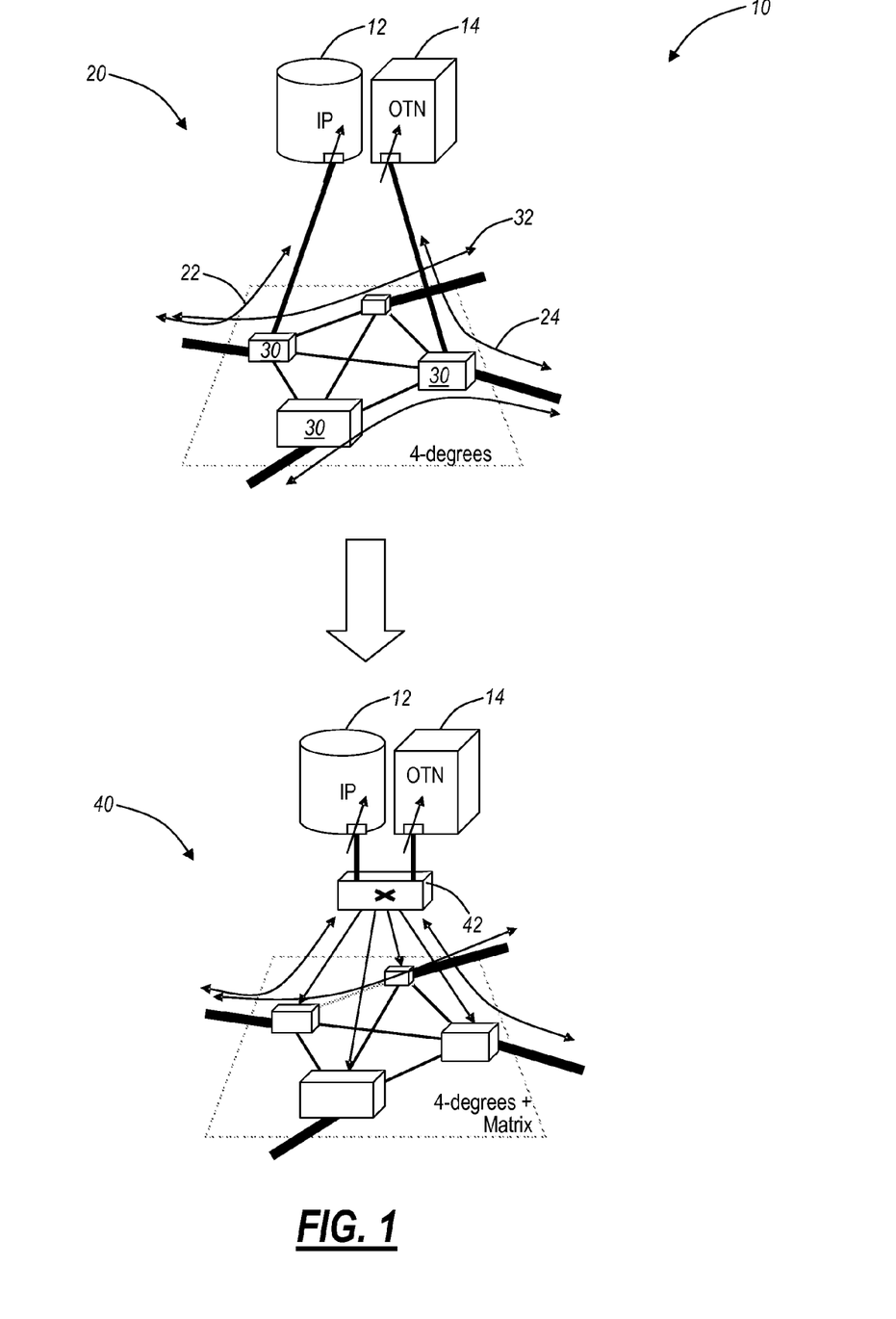
FIG. 1 is a diagram of an exemplary 4-degree reconfigurable optical add/drop multiplexer (ROADM) with two add/drop clients, i.e. an Internet Protocol (IP) router/switch and an Optical Transport Network (OTN) switch in both a direction-constrained architecture and a direction-independent (i.e., "directionless") architecture.

Referring to FIG. 1, in an exemplary embodiment, a 4-degree ROADM 10 is illustrated with in two configurations with two add/drop clients, i.e. an Internet Protocol (IP) router/switch 12 and an Optical Transport Network (OTN) switch 14. In a first configuration 20, the ROADM 10 is constrained, in that each add/drop client signal 22, 24 can only route through one degree 30 (i.e., direction). Note that express wavelengths 32 can still pass from any-to-any network fiber, so long as these are not dropped locally. In a second configuration 40, a directionless optical or photonic switch 42 adds a "switch matrix" to the Add/Drop signal bank, which allows add/drop clients truly to be switched to any degree dynamically. Again, express wavelengths can pass from any-to-any degree. Further, the configuration 40 may be colorless as well with any port/client supporting any wavelength, e.g. colorless multiplexers, tunable transceivers, etc.

Directionless ROADMs have been disclosed using large N×N cross-connects. For example, these are disclosed by V. Kaman et al., "Multi-Degree ROADM's with Agile Add-Drop Access," (available at www.calient.net/_docs/Photonic-SwtConf_MultiDegreeROADMs_07.pdf) and by Sashisekaran Thiagarajan et al., "Direction-Independent Add/Drop Access for Multi-Degree ROADMs", OFC 2008 Proceedings, OThA7, Optical Society of America, February 2008. Two other approaches to ROADMs are disclosed by Ghelfi et al., "Optical Cross Connects Architecture with per-Node Add & Drop Functionality", Ghelfi et al., OFC 2007 Proceedings, NTuC3, Optical Society of America, February 2007. First, Ghelfi et al. disclose an optical cross-connect with per-port Add & Drop (OXC-PAD) using a 1×N WSS in each degree to route drop channels to N local transceivers. Add channels are collected using N×1 combiners. Each transceiver is connected to a pair of 1×N switches that direct the Tx/Rx signals to the WSS/combiner module associated with the selected degree. In a second approach, Ghelfi et al. add an additional degree to the ROADM and connect add/drop local traffic using that degree. Finally, various other directionless ROADM configurations are disclosed in commonly assigned U.S. patent application Ser. No. 12/045,933 filed on Mar. 11, 2008 and entitled "DIRECTIONLESS OPTICAL ARCHITECTURE AND HIGHLY AVAILABLE NETWORK AND PHOTONIC RESILIENCE METHODS," and in commonly assigned U.S. patent application Ser. No. 12/103,204 filed on Apr. 15, 2008 and entitled "DIRECTIONLESS RECONFIGURABLE OPTICAL ADD-DROP MULTIPLEXER SYSTEMS AND METHODS," the contents of each are herein incorporated by reference. These directionless ROADMs described above are provided for illustration purposes, and the present invention contemplates topology discovery on any type of ROADM node, network, or the like.

Directionless, colorless systems, such as the configuration 40, enable the ability to add/drop any wavelength at any port and to connect to all directions, routes, links, degrees, etc. from any local transceiver or transponder. Network operators and equipment vendors are moving towards designing and deploying directionless, colorless systems as these systems offer advantages such as optical restoration and protection, switching, scalability, wavelength switching on-demand, and the like. As networks and nodes are deployed and scaled with directionless, colorless systems, individual connections may become difficult to manage and track. In various exemplary embodiments, the present invention includes ROADM node automatic topology discovery systems and methods providing a mapping of optical connections within a mesh optical network that includes tunable lasers and multi-degree ROADM's with colorless/directionless add/drop. Further, the present invention may include integration with a network management system (NMS), element management system (EMS), and the like to manage and track detected topologies.

Figure 2:
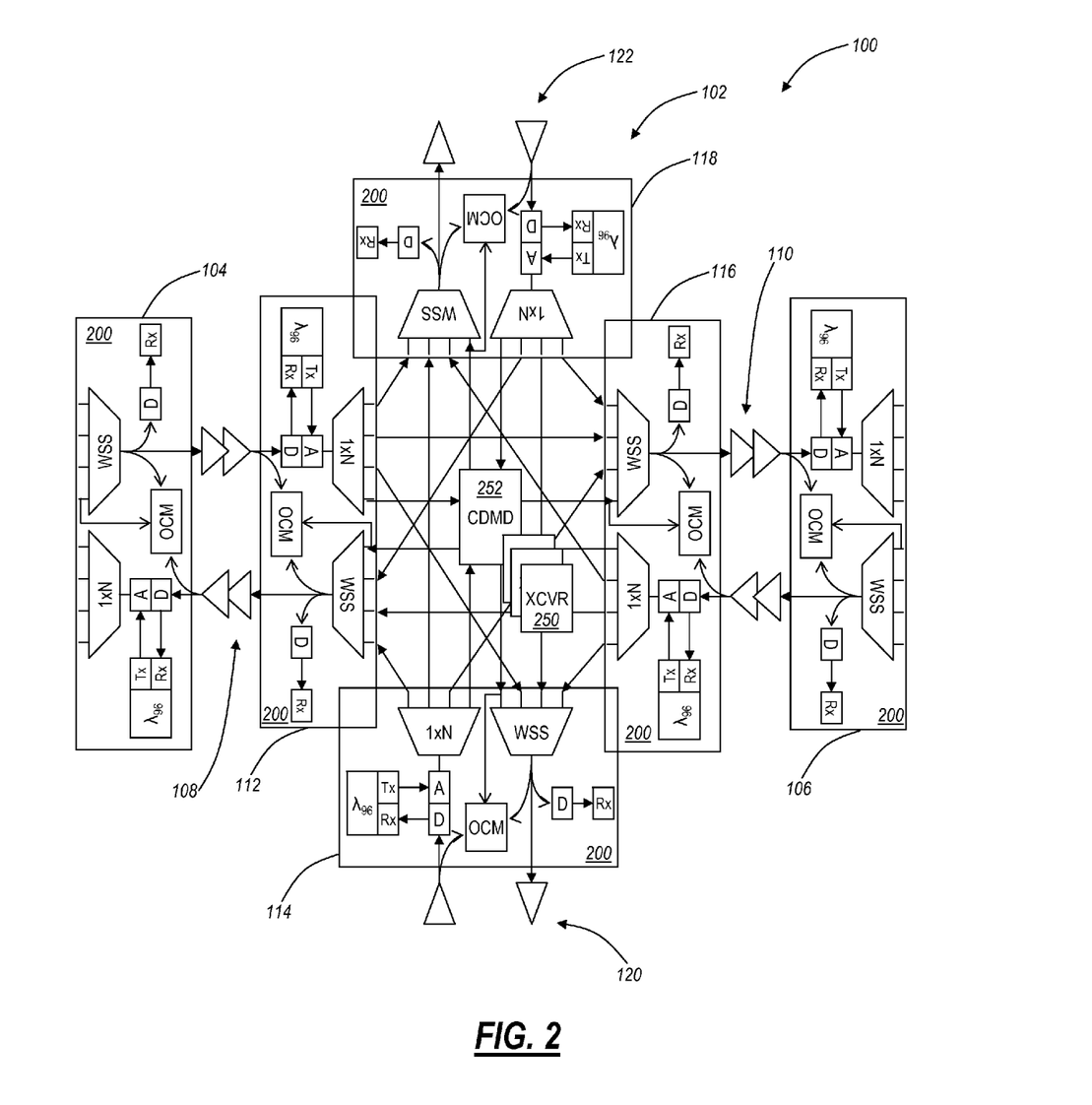
FIG. 2 is a diagram of a network portion of a larger optical network configured with automated topology discovery with the network portion including a 4-degree ROADM node interconnected to two other nodes through amplifier chains.

Referring to FIG. 2, in an exemplary embodiment, a network portion 100 is illustrated with a 4-degree ROADM node 102 interconnected to two other nodes 104, 106 through amplifier chains 108, 110. The 4-degree ROADM node 102 includes four degrees 112, 114, 116, 118, and is interconnected in a broadcast-and-select architecture. In the exemplary network portion 100, the degree 112 is connected to the node 104 through the amplifier chain 108 and the degree 116 is connected to the node 106 through the amplifier chain 110. The degrees 114, 118 interconnect to amplifiers 120, 122 that may extend these degrees 114, 118 to other nodes, etc. (not shown). In general, the network portion 100 is part of a larger optical network that may include various other components which are omitted from illustration herein for simplicity. For example, the larger optical network may be any of a long haul network, regional network, metro network, campus network, enterprise network, or the like. Further the larger optical network may include nodes of varying degrees besides the node 102 with 4-degrees and the nodes 104, 106 with 1-degree. The nodes may be interconnected in a mesh architecture leveraging the colorless, directionless capabilities described herein.

Figure 3:
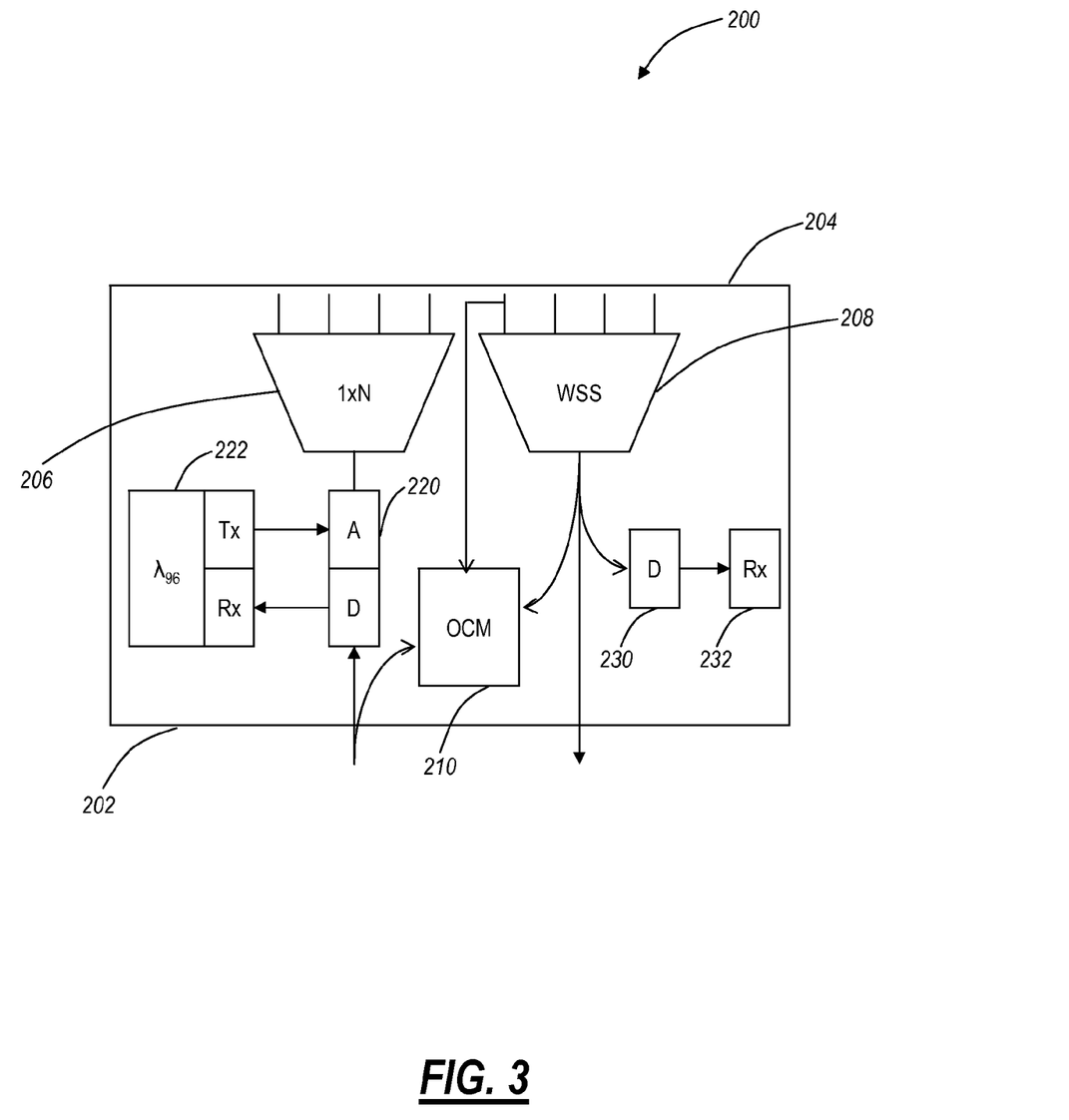
FIG. 3 is a block diagram of hardware associated with a ROADM degree from FIG. 2 illustrated associated components for a colorless and directionless ROADM with automated topology discovery capability.

Referring to FIG. 3, in an exemplary embodiment, each of the degrees 112, 114, 116, 118 may include a module 200 with automated topology discovery capability. The module 200 supports a single degree in a ROADM node using a broadcast-and-select architecture. Note, the broadcast-and-select architecture is shown for illustration purposes, and the module 200 may support other implementations. Further, the various components described herein with respect to the module 200 may be integrated into a single device, line card, module, etc. or may be distributed among several devices, line cards, modules, etc. In general, the module 200 includes a line side 202 and a node side 204, i.e. the line side 202 connects to a network and the node side 204 connects to local add/drop and/or other degrees. The module includes a 1×N splitter 206 and a N×1 wavelength selective switch (WSS) 208. The 1×N splitter 206 is utilized on a receive side (relative to the network) and the N×1 WSS 208 is utilized on a transmit side (relative to the network), and those of ordinary skill in the art will recognize that the module 200 could be constructed switching the location of the 1×N splitter 206 and the N×1 WSS 208 or replacing the 1×N splitter 206 by a second N×1 WSS 208. The 1×N splitter 206 is configured to broadcast an input (received) signal from one direction to various other interconnected degrees. The N×1 WSS 208 is configured to receive input (transmit) signals from the various interconnected degrees and to select appropriate signals for transmission to the network. Additionally, the module 200 may include an optical channel monitor (OCM) 210 for measuring individual per-channel power at various points in the module 200. In an exemplary embodiment, the OCM 210 may be utilized in place of the optical receiver 232 to detect the topology wavelength.

In various exemplary embodiments, the present invention includes an automated topology that enables the module 200 to do a complete mapping of the optical connections within a mesh optical network (i.e., to other modules 200) that includes tunable lasers and multi-degree ROADM's with colorless/directionless add/drop. Advantageously, the additional hardware/software that is required (add/drop filters, low speed transmitters and receivers), is relatively simple and inexpensive, using off-the-shelf components. Specifically, the present invention includes designating one of a plurality of support wavelengths solely for topology discovery. For example, assume a wavelength division multiplexed (WDM) system using the module 200 supports 96 possible wavelengths, which normally would all be available to carry data. The present invention reserves one of these wavelengths, designated as $\lambda 96$, for topology discovery, i.e. only 95 wavelengths are available to carry data. Note, the particular WDM system may use any wavelength and may include any amount of total supported wavelengths. Further, the topology wavelength does not necessarily have to be a fixed wavelength, i.e. the user or even the system software could choose any one of the available wavelengths as it sees fit. Here, the topology wavelength may include a tunable transceiver. This approach of the present invention may be used both to verify connections between the transceivers (XCVR's) and ROADM cards such as the module 200, as well as connections between ROADM cards, within the same network element or across different nodes.

To facilitate the automated discovery connections, the module 200 includes an add/drop filter 220 connected to a low-speed transceiver 222 on the receive side and a drop filter 230 connected to a receiver 232 on the transmit side. Additionally, the low-speed transceiver 222 and the receiver 232 may include a management interface to an NMS, EMS, etc. from the module 200. For example, in one exemplary embodiment, the module 200 may plug into a shelf or the like with a backplane connection and the low-speed transceiver 222 and the receiver 232 may communicate via this backplane connection to the NMS, EMS, etc. In another exemplary embodiment, the module 200 may include an Ethernet port or the like that connects to the NMS, EMS, etc. either directly or via a data communications network. In yet another exemplary embodiment, the low-speed transceiver 222 and the receiver 232 may communicate to the NMS, EMS via an optical service channel (OSC) or the like. The low-speed transceiver 222 and the receiver 232 may be configured to transmit/receive data such as node name, address, card ID/location, etc. Such information may be gathered via the low-speed transceiver 222 and the receiver 232 to map connections in the node and the network as is described herein in FIGS. 4 and 5.

Referring back to FIG. 2, as described above, each of the degrees 112, 114, 116, 118 and the nodes 104, 106 may include one of the modules 200. Additionally, local to the 4-degree node 102, there may be a plurality of local add/drop transceivers 250 and a Colorless/Directionless multiplexer/demultiplexer module (CDMD) 252. The CDMD 252 can arbitrarily connect the transceivers 250 to the different degrees 112, 114, 116, 118, at any available wavelength. The present invention contemplates any implementation of the CDMD 252. For example, the CDMD 252 may include a plurality of combiners, splitters, optical amplifiers, optical switches, tunable filters, wavelength blockers and WSSs. Alternatively, the transceivers 250 may be directly connected to any of the degrees 112, 114, 116, 118. Further, the degrees 112, 114, 116, 118 may be interconnected to one another thereby enabling express through for channels.

Figure 4:
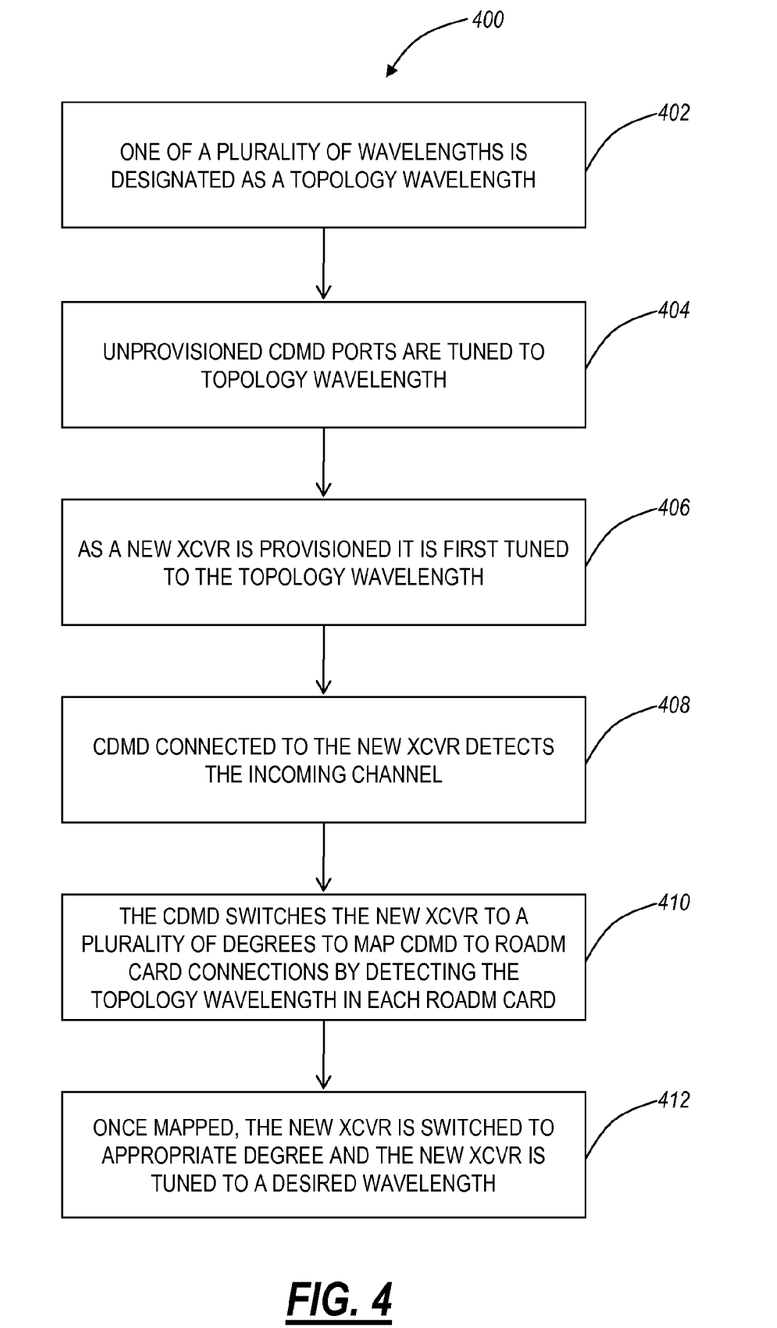
FIG. 4 is a flowchart of an exemplary automated topology method for detecting new transceiver and Colorless/Directionless multiplexer/demultiplexer module (XCVR/CDMD) interconnects in a ROADM node/network/system.

Referring to FIG. 4, in an exemplary embodiment, a flowchart illustrates an exemplary automated topology method 400 for detecting new XCVR/CDMD interconnects in a ROADM node/network/system. The automated topology method 400 may be implemented with any node or network configured to provide automated topology discovery for colorless, directionless ROADMs. In particular, the automated topology method 400 designates one of a plurality of wavelengths as a topology wavelength (step 402). In the example of FIGS. 2-3, the system includes 96 total wavelengths and $\lambda 96$ is designated as the topology wavelength. The topology wavelength is dedicated across all nodes solely for automated topology discovery and thus is unavailable for carrying traffic. At a node, unprovisioned CDMD ports are tuned to the topology wavelength (step 404). For example, in FIG. 2, the CDMD 252 would be tuned to $\lambda 96$. When a new XCVR is provisioned in the system, it is initially tuned to $\lambda 96$ (step 406). For example, the XCVRs include tunable transmitters capable of tuning to any of the plurality of wavelengths including the topology wavelength. The CDMD connected to the new XCVR detects the incoming channel at the topology wavelength (step 408). The CDMD then switches this topology wavelength from the new XCVR to a plurality of degrees to map connections between the CDMD and the plurality of degrees, cycling through each one (step 410). Each of the plurality of degrees includes hardware such as the module 200, a ROADM card, etc. capable of supporting the automated topology method 400, i.e. transmission and detection of the topology wavelength. Each degree is able to detect the presence of this topology wavelength using a built-in OCM, therefore confirming the connection between a particular combination of CDMD port and ROADM/degree port. Alternatively, a $\lambda 96$ Receiver (e.g., the receiver 232 in FIG. 2) placed after the WSS may be used for this purpose instead of the OCM. This automated topology method 400 maps out all the possible connections between the XCVR and the ROADM node. Once the connections are confirmed/mapped, the XCVR may be tuned to another of the plurality wavelengths and be placed in service to carry data (step 412). Additionally, interconnection data between the XCVR and the ROADM node may be sent via a data communications link to an NMS, EMS, etc. and stored therein in a database or the like.

Figure 5:
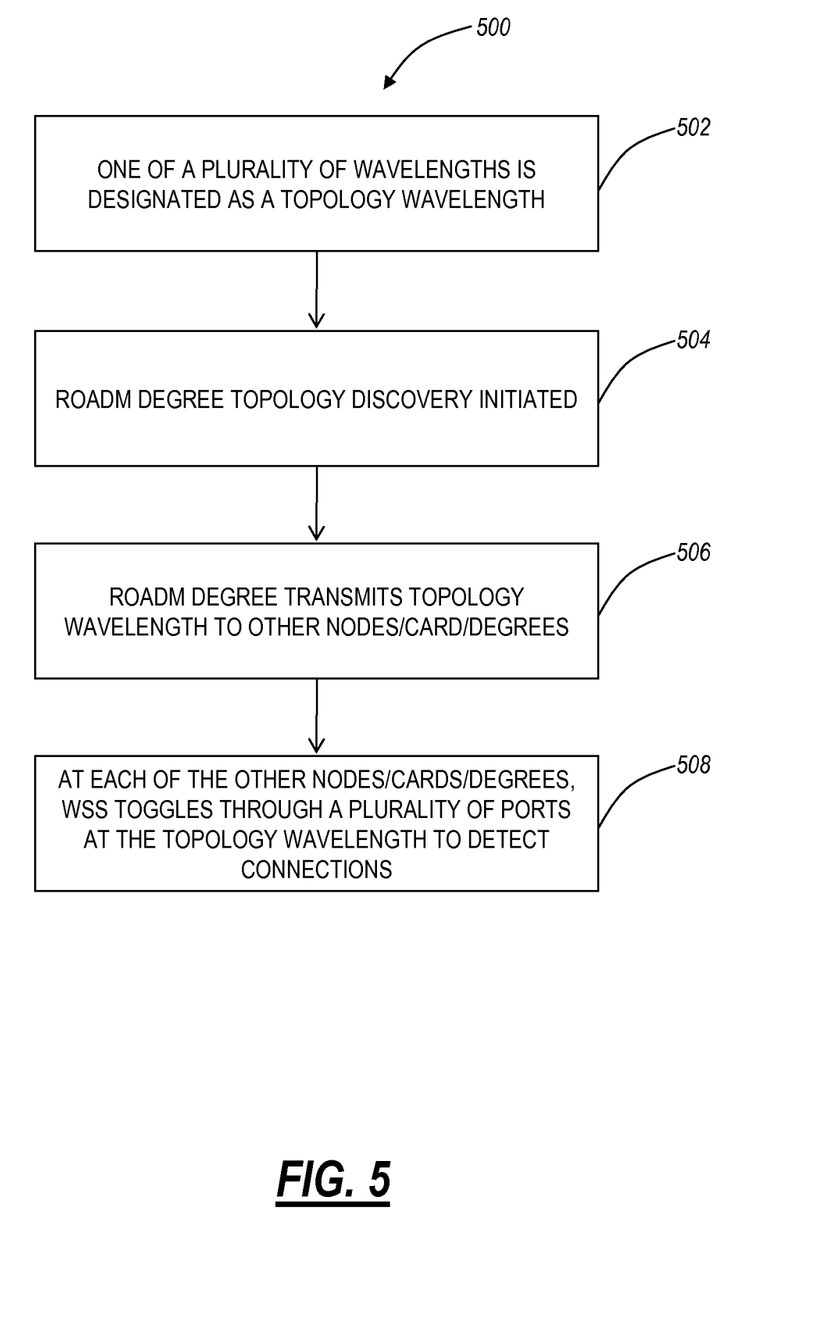
FIG. 5 is a flowchart of an exemplary automated topology method for detecting interconnections between degrees in a ROADM node/network/system.

Referring to FIG. 5, in an exemplary embodiment, a flowchart illustrates an exemplary automated topology method 500 for detecting interconnections between degrees in a ROADM node/network/system. Similar to the automated topology method 400, the automated topology method 500 may be implemented with any node or network configured to provide automated topology discovery for colorless, directionless ROADMs. In particular, the automated topology method 500 designates one of a plurality of wavelengths as a topology wavelength (step 502). In the example of FIGS. 2-3, the system includes 96 total wavelengths and $\lambda 96$ is designated as the topology wavelength. The topology wavelength is dedicated across all nodes solely for automated topology discovery and thus is unavailable for carrying traffic. The automated topology method 500 is configured to detect connections between ROADM cards/nodes/degrees using transmitters and receivers for the topology wavelength built into each ROADM card, such as described in FIGS. 2-3. The automated topology method 500 may be manually or automatically initiated (step 504). The transmitter includes a laser emitting at the topology wavelength, e.g. $\lambda 96$, which is transmitted to other nodes/cards/degrees (step 506). In an exemplary embodiment, information about the node, address card ID/location, etc. may be encoded in an output signal of the topology wavelength. This card ID signal is combined with the WDM channels using an Add filter and then broadcast to the other ROADM cards via a 1×N splitter. The other ROADM cards can then discover which cards they are connected to by toggling the WSS at $\lambda 96$ between their different inputs and reading the card ID signal from each input port (step 508). Note, e.g. in FIG. 2, that the WSS output is followed by a 1×3 splitter, with one output going to the OCM, one to the local $\lambda 96$ receiver and one to the output fiber connected to the next node. Since $\lambda 96$ (i.e., the topology wavelength) is within the gain bandwidth of the optical amplifiers, the card ID signal will propagate to the next node, where it is dropped to another $\lambda 96$ receiver, thus providing information about node-to-node connectivity. In this way, the entire mesh optical network can be mapped without disrupting the data traffic. Additionally, interconnection data between the ROADM nodes may be sent via a data communications link to an NMS, EMS, etc. and stored therein in a database or the like.

Figure 6:
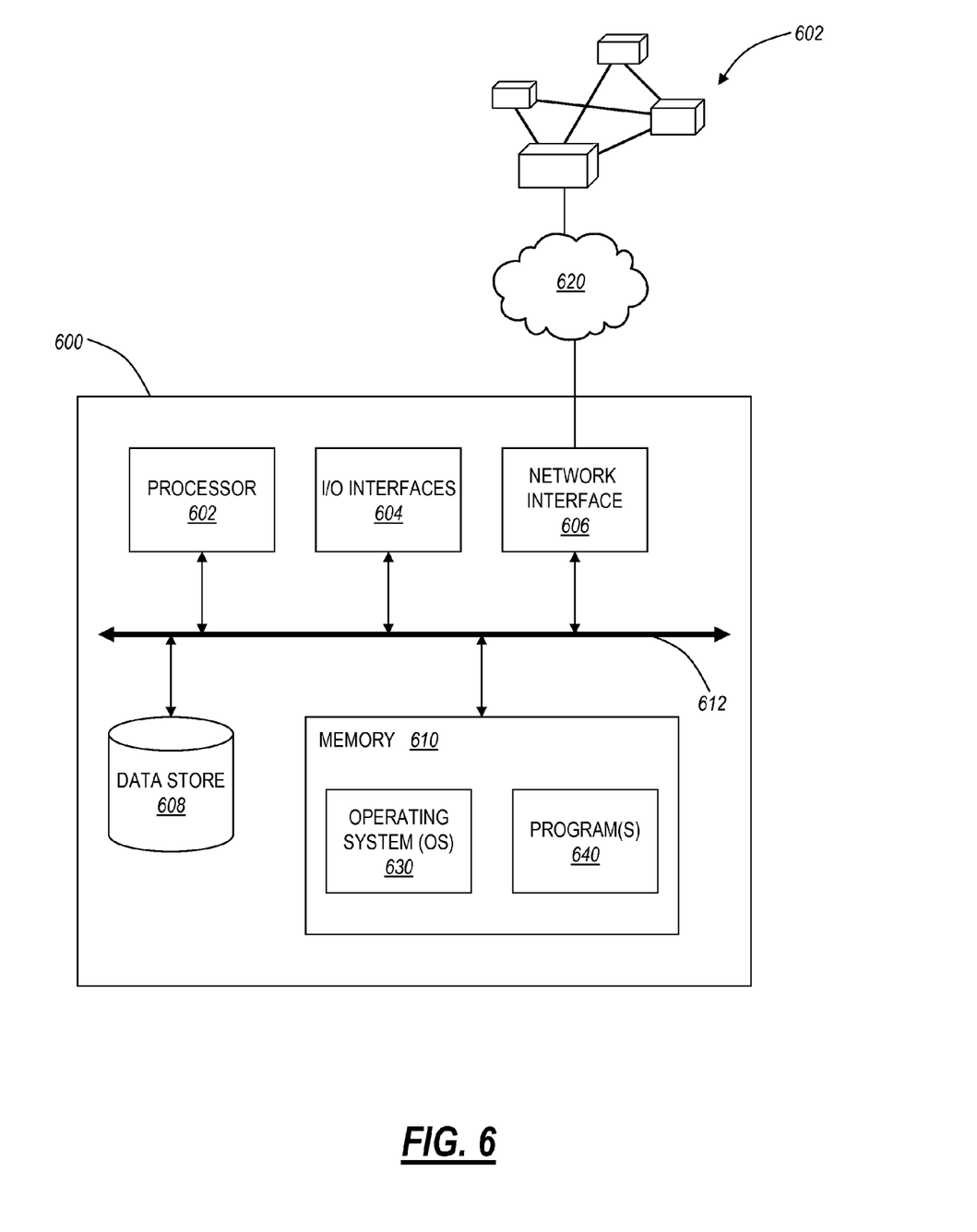
FIG. 6 is a block diagram of a management system connected to a ROADM network configured with automated topology discovery.

Referring to FIG. 6, in an exemplary embodiment, a block diagram illustrates a management system 600 connected to a ROADM network 602 configured with automated topology discovery. The management system 600 can be a digital computer that, in terms of hardware architecture, generally includes a processor 602, input/output (I/O) interfaces 604, a network interface 606, a data store 608, and a memory 610. The components (602, 604, 606, 608, and 610) are communicatively coupled via a local interface 612. The local interface 612 may be, for example but not limited to, one or more buses or other wired or wireless connections, as is known in the art. The local interface 612 may have additional elements, which are omitted for simplicity, such as controllers, buffers (caches), drivers, repeaters, and receivers, among many others, to enable communications. Further, the local interface 612 may include address, control, and/or data connections to enable appropriate communications among the aforementioned components. In an exemplary embodiment, the management system 600 may include an NMS, EMS, craft interface, etc. configured to provide operations, administration, maintenance, and provisioning (OAM&P) for the ROADM network 602. In another exemplary embodiment, the management system 600 may include a module, card, etc. equipped in a node associated with the ROADM network 602. In yet another exemplary embodiment, the management system 600 may be a control plane processor or equivalent configured to operate an optical signaling and routing protocol associated with the ROADM network 602. For example, optical signaling and routing protocols may include Optical Signaling and Routing Protocol (OSRP), Automatically Switched Optical Network (ASON), Generalized Multi-Protocol Label Switching (G-MPLS), or the like. Here, the automated topology discovery may be further integrated with the optical signaling and routing protocols providing updates to a topology database associated with the optical signaling and routing protocols.

The processor 602 is a hardware device for executing software instructions. The processor 602 may be any custom made or commercially available processor, a central processing unit (CPU), an auxiliary processor among several processors associated with the management system 600, a semiconductor-based microprocessor (in the form of a microchip or chip set), or generally any device for executing software instructions. When the management system 600 is in operation, the processor 602 is configured to execute software stored within the memory 610, to communicate data to and from the memory 610, and to generally control operations of the management system 600 pursuant to the software instructions. The I/O interfaces 604 may be used to receive user input from and/or for providing system output to one or more devices or components. User input may be provided via, for example, a keyboard and/or a mouse. System output can be provided via a display device and a printer (not shown). I/O interfaces 604 can include, for example, a serial port, a parallel port, a small computer system interface (SCSI), an infrared (IR) interface, a radio frequency (RF) interface, and/or a universal serial bus (USB) interface. Also, if the management system 600 is a card or module in a node, the I/O interfaces 604 may include backplane interfaces to communicate to a shelf/rack.

The network interfaces 606 may be used to enable the management system 600 to communicate on a network, such as the Internet. For example, the management system 600 may utilize the network interfaces 606 to communicate between the ROADM network 602 and the management system 600 via a data communication network 620. The network interfaces 606 may include, for example, an Ethernet card (e.g., 10BaseT, Fast Ethernet, Gigabit Ethernet) or a wireless local area network (WLAN) card (e.g., 802.11a/b/g). The network interfaces 606 may include address, control, and/or data connections to enable appropriate communications on the network. A data store 608 may be used to store data, such as discovered topology data. The data store 608 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 608 may incorporate electronic, magnetic, optical, and/or other types of storage media. In one example, the data store 608 may be located internal to the management system 600 such as, for example, an internal hard drive connected to the local interface 612 in the management system 600. Additionally in another embodiment, the data store 608 may be located external to the management system 600 such as, for example, an external hard drive connected to the I/O interfaces 604 (e.g., SCSI or USB connection). Finally in a third embodiment, the data store 608 may be connected to the management system 600 through a network, such as, for example, a network attached file server.

The memory 610 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 610 may incorporate electronic, magnetic, optical, and/or other types of storage media. Note that the memory 610 may have a distributed architecture, where various components are situated remotely from one another, but can be accessed by the processor 602. The software in memory 610 may include one or more software programs, each of which includes an ordered listing of executable instructions for implementing logical functions. The software in the memory 610 includes a suitable operating system (O/S) 630 and one or more programs 640. The operating system 630 essentially controls the execution of other computer programs, such as the one or more programs 630, and provides scheduling, input-output control, file and data management, memory management, and communication control and related services. The operating system 630 can be any of Windows NT, Windows 2000, Windows XP, Windows Vista, Windows Server, Windows 7 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), or the like. The one or more programs 640 may be configured to implement the various algorithms described herein.

In particular, the one or more programs 640 may include OAM&P programs and a graphical user interface (GUI) allowing network operators to interact with the ROADM network 602. One of the programs 640 may provide support for interacting with the ROADM network 602 for automated topology discovery. For example, this may be during provisioning of new XCVRs or ROADM degrees. Specifically, the programs 640 may be configured to direct nodes in the ROADM network 602 to implement the methods 400, 500 and to receive corresponding output or to simply receive corresponding output responsive to operation of the methods 400, 500. The corresponding output may be stored in the data store 608 and utilized with various other functions associated with the management system 600. For example, the GUI may display a network map in a graphical format. As such, the discover topology may be utilized to automatically generate and display a network map of the ROADM network 600.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A degree in a reconfigurable optical add drop multiplexer node, comprising:
   transmit optical components configured to receive a plurality of transmit wavelengths and to transmit the plurality of transmit wavelengths external to the node;
   receive optical components configured to receive a plurality of receive wavelengths external from the node and to transmit the plurality of receive wavelengths to one or more components in the node; and
   topology optical components configured to transmit and receive a topology wavelength both external to the node and to the one or more components in the node, wherein the topology optical components are connected to the transmit optical components and the receive optical components, wherein in a wavelength division multiplexed system there are N wavelengths available for carrying data, wherein the topology wavelength comprises one of the N wavelengths that is dedicated and unavailable for carrying traffic and is within a gain bandwidth of an optical amplifier, and wherein the topology wavelength is being detected at an unprovisioned port in the reconfigurable optical add drop multiplexer node, and the reconfigurable optical add drop multiplexer node is configured to map connections based on the topology wavelength and further passes the topology wavelength to other nodes.

2. The degree of claim 1, wherein the topology wavelength comprises the same wavelength in the plurality of transmit wavelengths and the plurality of receive wavelengths, and wherein the topology wavelength is dedicated to providing topology discovery.

3. The degree of claim 1, further comprising:
a topology discovery algorithm utilizing the topology optical components to detect connections of the degree to other degrees in the reconfigurable optical add drop multiplexer node and to other nodes connected to or through the reconfigurable optical add drop multiplexer node.

4. The degree of claim 3, wherein the topology discovery algorithm comprises:
transmitting the topology wavelength using the topology optical components; and
mapping connections of the degree through a network and the reconfigurable optical add drop multiplexer node responsive to topology optical components detecting the topology wavelength.

5. The degree of claim 1, further comprising:
one or more local add/drop transceivers connected to the transmit optical components and the receive optical components; and
a topology discovery algorithm utilizing the topology optical components to detect connections of the one or more local add/drop transceivers.

6. The degree of claim 5, wherein the topology discovery algorithm comprises:
tuning a transceiver to the topology wavelength;
connecting the transceiver to the transmit optical components; and
detecting connections through a network and the reconfigurable optical add drop multiplexer node responsive to topology optical components detecting the topology wavelength.

7. The degree of claim 1, further comprising:
a Colorless/Directionless multiplexer/demultiplexer module connected to transmit optical components and the receive optical components;
one or more local add/drop transceivers connected to the Colorless/Directionless multiplexer/demultiplexer module; and
a topology discovery algorithm utilizing the topology optical components to detect connections of the Colorless/Directionless multiplexer/demultiplexer module and the one or more local add/drop transceivers.

8. The degree of claim 7, wherein the topology discovery algorithm comprises:
tuning unprovisioned ports on the Colorless/Directionless multiplexer/demultiplexer module to the topology wavelength;
tuning a transceiver to the topology wavelength;
connecting the transceiver to a port on the Colorless/Directionless multiplexer/demultiplexer module;
switching the transceiver via the Colorless/Directionless multiplexer/demultiplexer module to a plurality of degrees; and
detecting connections through a network and the reconfigurable optical add drop multiplexer node responsive to topology optical components detecting the topology wavelength.

9. The degree of claim 1, wherein the topology optical components comprise:
a transceiver configured to transmit and receive at the topology wavelength; and
one of an optical channel monitor configured to receive and detect the topology wavelength and a receiver configured to receive and detect the topology wavelength.

10. The degree of claim 9, wherein the transceiver is connected to the receive optical components and the one of the optical channel monitor and the receiver is connected to the transmit optical components.

11. The degree of claim 9, wherein the transceiver comprises data modulation configured to encode any of node identification, address, and channel identification on the topology wavelength.

12. The degree of claim 1, wherein the topology optical components are configured to operate in-service to map connections through the reconfigurable optical add drop multiplexer node and through a network containing the reconfigurable optical add drop multiplexer node without disrupting data traffic.

13. The degree of claim 1, wherein the transmit optical components and the receive optical components comprise any of 1×N combiners, 1×N splitters, optical switches, wavelength blockers and wavelength selective switches configured to provide a colorless and directionless architecture.

14. A method for automated topology discovery in an optical network, comprising:
dedicating one of a plurality of wavelengths supported in the optical network as a topology wavelength, wherein in a wavelength division multiplexed system there are N wavelengths available for carrying data, wherein the topology wavelength comprises one of the N wavelengths that is dedicated and unavailable for carrying traffic and is within a gain bandwidth of an optical amplifier, and wherein the topology wavelength is being detected at an unprovisioned port in a node in the optical network, and the node is configured to map connections based on the topology wavelength and further passes the topology wavelength to other nodes in the optical network;
transmitting the topology wavelength from one degree at one node in the optical network; and
mapping connections of the one degree through the optical network responsive to topology optical components at each degree in the optical network detecting the topology wavelength.

15. The method of claim 14, further comprising:
transmitting detected connections to a management system; and
utilizing the detected connections to display a network map in the management system.

16. The method of claim 14, further comprising:
adding a transceiver to a node in the optical network;
tuning a transceiver to the topology wavelength;
connecting the transceiver a degree at the node; and
detecting connections through the optical network responsive to topology optical components at each degree in the optical network detecting the topology wavelength.

17. The method of claim 14, further comprising:
tuning unprovisioned ports on a Colorless/Directionless multiplexer/demultiplexer module to the topology wavelength;

tuning a transceiver to the topology wavelength;

connecting the transceiver to a port on the Colorless/Directionless multiplexer/demultiplexer module;

switching the transceiver via the Colorless/Directionless multiplexer/demultiplexer module to a plurality of degrees; and detecting connections through the optical network responsive to topology optical components at each degree in the optical network detecting the topology wavelength.

18. A mesh optical network, comprising:

a plurality of interconnected reconfigurable optical add drop multiplexer nodes, wherein each of the plurality of interconnected reconfigurable optical add drop multiplexer nodes comprises at least one optical degree;

topology discovery hardware at each of the optical degrees, the topology discovery hardware is configured to transmit and receive a topology wavelength comprising one of a plurality of wavelengths for automatically discovering topology of the mesh optical network, wherein in a wavelength division multiplexed system there are N wavelengths available for carrying data, wherein the topology wavelength comprises one of the N wavelengths that is dedicated and unavailable for carrying traffic and is within a gain bandwidth of an optical amplifier, and wherein the topology wavelength is being detected at an unprovisioned port in an interconnected reconfigurable optical add drop multiplexer node, and the interconnected reconfigurable optical add drop multiplexer node is configured to map connections based on the topology wavelength and further passes the topology wavelength to other interconnected reconfigurable optical add drop multiplexer nodes.

19. The mesh optical network of claim 18, further comprising:

a management system connected to one or more of the plurality of interconnected reconfigurable optical add drop multiplexer nodes;

wherein the management system is configured to receive the discovered topology from each of the optical degrees.

20. The mesh optical network of claim 18, wherein the plurality of interconnected reconfigurable optical add drop multiplexer nodes comprise colorless and directionless components.

* * * * *